(12) United States Patent
DePaola (10) Patent No.: US 11,516,996 B1
(45) Date of Patent: Dec. 6, 2022

(54) PNEUMATICALLY CONTROLLED AQUACULTURE APPARATUS

(71) Applicant: Angelo DePaola, Coden, AL (US)

(72) Inventor: Angelo DePaola, Coden, AL (US)

( * ) Notice: Subject to any disclaimer, the term of this patent is extended or adjusted under 35 U.S.C. 154(b) by 555 days.

(21) Appl. No.: 16/681,562

(22) Filed: Nov. 12, 2019

(51) Int. Cl.
*A01K 61/60* (2017.01)
*A01K 61/55* (2017.01)

(52) U.S. Cl.
CPC .............. *A01K 61/55* (2017.01); *A01K 61/60* (2017.01)

(58) Field of Classification Search
CPC ... A01K 61/53–55; A01K 61/59; A01K 61/60
USPC .................................................. 119/239, 240
See application file for complete search history.

(56) References Cited

U.S. PATENT DOCUMENTS

| 3,179,960 | A | | 4/1965 | Nimmo | |
|---|---|---|---|---|---|
| 4,766,846 | A | * | 8/1988 | Lavoie | A01K 61/54 119/240 |
| 4,798,169 | A | * | 1/1989 | Rosen | A01K 61/60 119/223 |
| 7,341,021 | B2 | * | 3/2008 | Cortinas | A01K 61/54 119/239 |
| 7,650,856 | B2 | | 1/2010 | Cortinas et al. | |
| 9,655,347 | B2 | * | 5/2017 | Troy | A01K 61/65 |
| 10,357,023 | B2 | | 7/2019 | DePaola | |
| 2016/0286767 | A1 | | 10/2016 | Newell | |
| 2019/0116767 | A1 | | 4/2019 | DePaola | |
| 2019/0289832 | A1 | | 9/2019 | DePaola | |

FOREIGN PATENT DOCUMENTS

| DE | 102012011283 A1 | 6/2012 | |
|---|---|---|---|
| JP | 2012207420 A | 10/2012 | |
| WO | WO-2015055867 A1 * | 4/2015 | ........... A01K 61/007 |

* cited by examiner

*Primary Examiner* — Peter M Poon
*Assistant Examiner* — Danielle A Clerkley
(74) *Attorney, Agent, or Firm* — AdamsIP, LLC (57) ABSTRACT

A pneumatically controlled aquaculture apparatus is provided. The apparatus has a lift vessel that lifts containers holding shellfish out of the water when the lift vessel is floating in order to allow air desiccation to prevent biofouling of the equipment and shellfish. The apparatus also has a buoy bladder positioned above the containers holding shellfish. The buoy bladder is retained in a centered position of the apparatus. The apparatus may be deployed in a suspended position with the buoy bladder floating on the water surface and the containers holding shellfish suspended below the buoy bladder. In addition, the apparatus may be deployed in a submerged position in which the buoy bladder is deflated and the apparatus is either resting on the water bottom or retained in a desired position in the water column.

21 Claims, 7 Drawing Sheets

PNEUMATICALLY CONTROLLED AQUACULTURE APPARATUS

FIELD OF THE INVENTION

The present invention refers generally to an aquaculture apparatus and, more specifically, to a pneumatically controlled apparatus for use in varying depths of water.

BACKGROUND

It is estimated that over 90% of oysters, clams, and mussels produced for consumption worldwide come from aquaculture farms. In particular, due to loss of wild oyster reefs, small-scale aquaculture of oysters has increased significantly in recent years. Typical shellfish aquaculture farms utilize baskets, cages, trays, racks, or similar containers for holding the oysters either on the water bottom or off-bottom. Generally, oysters grow best when submerged in nutrient-rich brackish water elevated above the bottom to prevent contact with predators such as destructive worms and snails or suffocation from silting. When growing oysters, approximately once a week they should be raised above the surface for approximately a 24-hour period. This permits the oysters to air dry, killing barnacles, algae and other micro-organisms which attach to their shells. This weekly process is referred to as desiccation.

Once the oysters have dried they must be re-submerged to grow until the next desiccation is required. Between desiccations, the oysters and aquaculture equipment remain submerged in natural water bodies for extended periods of time during the growth of the oyster to a matured state suitable for harvest. During submerged periods, a biofilm of microorganisms may form on outer surfaces of the shellfish and the submerged aquaculture equipment, which can lead to the attachment of nuisance bio-fouling organisms such as barnacles and unwanted bivalve shellfish. Bio-fouling organisms create nuisance by clogging mesh or pores in shellfish containers, which reduces water flow through the containers and food availability for the shellfish, thereby slowing growth of culture shellfish. Additionally, bio-fouling organisms attach directly to shellfish causing visual defects that reduce market value. Unwanted organisms also add excessive weight to the system and can damage moving parts of the aquaculture equipment. Periodic emergence of the equipment and shellfish in the air above the sea surface desiccates the biofilm before it sufficiently establishes to permit attachment of bio-fouling organisms. Emergence of the equipment eliminates the need to pressure wash or clean equipment and shellfish by other means after bio-fouling organisms colonize the exposed surfaces.

In productive shellfish growing areas such as the Gulf of Mexico, desiccation of gear at weekly intervals is typically required to control bio-fouling. Currently employed methods for bio-fouling control rely on intensive and potentially unsafe manual labor practices. Typical aquaculture systems comprise rectangular containers constructed of heavy plastic coated wire mesh that are assembled with multiple container compartments for holding flexible plastic mesh bags of varying mesh sizes that contain shellfish at various growth stages. The containers typically have two air-filled floats attached to the top of the containers on the outside edges on opposing sides to maximize stability to wave action. The air-filled floats provide adequate buoyancy to float the oyster-filled containers below the surface of the water for growing the oysters. The normal bio-fouling practice employed with floating aquaculture systems is to manually flip the containers upside down so the floats are then on the bottom of the containers. Float buoyancy elevates the oysters and the containers in the air above the water surface. In shallow areas, flipping the containers is often done by wading, but boats are required to work deeper or colder waters. Relatively calm waters are required to flip the containers from boats. After a desiccation period of about 24 hours, the containers are manually flipped back into the growth position until the next desiccation treatment.

This method of bio-fouling control is labor intensive and time consuming, which drives up oyster production costs. In addition, there are safety risks involved with the manual flipping of the oyster-filled containers, which can be extremely heavy. To limit the weight, smaller containers or groups of containers must be utilized, thereby limiting the potential scale of an operation. Floating shellfish gear is vulnerable to high wave energy and debris fields during hurricanes or other storm events. While sinking gear in advance of such events reduces vulnerability and losses, sinking numerous small floating gear units is very time consuming and should be done well in advance of storm conditions. Raising gear is even more laborious and time consuming. Current methods of shellfish aquaculture require large tracts of publicly-owned water bottoms and the waters located above to grow oysters. Significant manual labor is required to manipulate and maintain the gear associated with these methods and to accomplish the desiccation process while also protecting gear and crop from storm damage. In 2018 alone, oyster farmers in North Carolina lost an estimated $10 million, while farmers in Florida lost an estimated $20 million due to damage caused by Hurricanes Florence and Michael, respectively.

To minimize labor, reduce safety hazards in the desiccation process, and prevent loss of gear and crop, some aquaculture devices have been developed that provide pneumatic control of the floatation of the devices so that the containers holding shellfish may be lifted and held above the surface of the water by adding compressed air to tanks positioned on a bottom side of the device, thereby providing a more efficient desiccation process. The air may then be evacuated from the tanks and displaced by water to return the device to a submerged position to allow shellfish to grow inside the submerged containers. Such devices are effective in relatively shallow bodies of water in which one end of the device can be pneumatically lifted to the water surface while the other end rests on the water bottom, which provides stability of the device during the process of floating the device to the surface and sinking the device to the sea floor so that the device does not inadvertently overturn. However, in deeper bodies of water, the process of floating such an aquaculture device for desiccation does not allow a portion of the device to remain in contact with the water bottom, which may cause instability as the aquaculture device rises or sinks in the water column. Consequently, such devices may be prone to overturning due to a lack of stability when floating the device from the water bottom to the water surface in a deeper body of water.

Therefore, a need exists in the art for a floating aquaculture device for use in deeper bodies of water. Additionally, a need exists in the art for a method of using such an aquaculture device that allows the device to be floated from the water bottom to the water surface in a stable manner that prevents the device from overturning.

SUMMARY

The aquaculture apparatus of the present disclosure allows for aquaculture activities in deeper bodies of water by providing pneumatic control of movement of the apparatus through the water column in a stable manner. The present aquaculture apparatus also provides for automated air desiccation of shellfish produced in off-bottom containerized aquaculture systems for the purposes of controlling biofouling on the surfaces of the shellfish and aquaculture equipment. In one aspect, a pneumatically controlled apparatus for shellfish aquaculture comprises a lift vessel, a container for holding shellfish, an inflatable buoy bladder, and a compressed gas source configured to independently supply gas to each of the lift vessel and the buoy bladder. The buoy bladder is disposed above both the container and the lift vessel when the apparatus is in an upright position for normal use. The buoy bladder is retained in a centered position of the apparatus, preferably by a frame secured to the apparatus. A lift vessel fluid supply line connects the lift vessel to the compressed gas source, and a buoy bladder fluid supply line connects the buoy bladder to the compressed gas source. In a preferred embodiment, these gas lines are connected to a manifold having valves for independent control of gas flows. The compressed gas is preferably air, and the compressed gas source is preferably a pressurized tank, such as a SCUBA tank, or an air compressor.

The aquaculture apparatus is adapted for use in three positions: a floating position, a suspended position, and a submerged position. When in the submerged position, the apparatus may be resting on the sea floor or, alternatively, positioned at a desired depth in the water column. When in the floating position, the lift vessel is filled with gas and the container holding shellfish is positioned above the surface of the water. Thus, in the floating position, the shellfish may be held out of the water for a period of time sufficient to allow air desiccation in order to prevent the formation of biofilm on the containers and shellfish, and various aquaculture activities may additionally be performed while the apparatus is floating. While in the floating position, the apparatus can also be towed to a different location to enhance growth and flavor or to avoid hazards to the health of aquatic species or human health, such as pollution from pathogens or harmful chemicals. When in the suspended position, the buoy bladder is inflated with gas so that it floats on the water surface with both the container holding shellfish and the lift vessel suspended under the water surface below the buoy bladder. To sink the lift vessel down to the suspended position, gas is evacuated from the lift vessel. In a preferred embodiment, the lift vessel comprises a lift tank having rigid walls, and gas is evacuated from the lift tank by displacing the air in the lift tank with water. In an alternative embodiment, the lift vessel may comprise an inflatable lift bladder, which is preferably disposed within a rigid cage to protect the lift bladder and to retain it in a fixed position. In this embodiment, gas may simply be evacuated from the lift bladder, which results in the lift bladder collapsing into a flattened state. When the apparatus is in the submerged position, the buoy bladder is deflated and gas is evacuated from the lift vessel so that the apparatus is resting on the water bottom. The apparatus may be left in the submerged position for a desired period of time to allow for shellfish growth before harvesting or to avoid storm waves. Alternatively, the apparatus may optionally further comprise a second buoy tethered to the apparatus so that the apparatus can be positioned at any desired depth in the water column rather than resting on the water bottom. The second buoy floats at the water surface, and the length of the tethering line determines the depth of the apparatus in the water column.

The apparatus may be moved sequentially in steps from the floating position to the suspended position to the submerged position, and then, by reversing the steps, from the submerged position to the suspended position to the floating position. To move the apparatus from the submerged position to the suspended position, air is supplied to the buoy bladder to inflate the buoy bladder, thereby causing the apparatus to rise in the water column until the buoy bladder is floating on the water surface with both the container and the lift vessel suspended in the water below the buoy bladder. To then move the apparatus from the suspended position to the floating position, air is supplied to the lift vessel, which causes the lift vessel to rise from the suspended position to the floating position in which the container holding shellfish is lifted and held above the water surface. In a preferred embodiment, the lift vessel is a tank having an opening located on a bottom side of the tank. In this embodiment, when air is supplied to the lift tank, the air displaces water inside the lift tank by forcing the water out of the opening. By retaining the buoy bladder in a centered position of the apparatus, stability is maintained so that the apparatus does not inadvertently overturn due to one side of the lift tank floating before an opposite side of the lift tank, which could cause instability. The process of floating the apparatus may be repeated each time bio-fouling treatment is required.

To reverse this process and move the apparatus from the floating position back to the suspended position, pressure in the lift tank may be relieved to the atmosphere so that water then displaces the air in the lift tank via water entering the lift tank through the opening on the bottom side of the lift tank, thereby causing both the lift tank and the container to sink to the suspended position while the buoy bladder is inflated and floating on the water surface. Once pressure is removed from the lift tank, the weight of the apparatus will cause water to displace the air inside the lift tank. To then move the apparatus from the suspended position to the submerged position, pressure on the buoy bladder is relieved so that the buoy bladder deflates, thereby causing the entire apparatus to sink to the bottom of the body of water. The rate of deflation of the buoy bladder may be controlled so that the apparatus sinks slowly in a controlled manner.

Accordingly, one object of the present invention is to provide an aquaculture apparatus having pneumatic floatation control for sinking and floating the apparatus in a controlled manner that allows for use of the apparatus in deeper bodies of water. Another object of the present invention is to provide a method utilizing the present apparatus for aquaculture activities in deeper bodies of water. Yet another object of the present invention is to provide an aquaculture apparatus that may be deployed at varying positions within the water column.

DESCRIPTION OF THE DRAWINGS

These and other features, aspects, and advantages of the present invention will become better understood with regard to the following description, appended claims, and accompanying drawings where:

DETAILED DESCRIPTION

In this disclosure, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components. The term tubes, tanks, and pontoons, as used herein, are interchangeable.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-5 illustrate a preferred embodiment of an aquaculture apparatus 10 that may be utilized for shellfish aquaculture activities in relatively deep bodies of water. The present aquaculture apparatus 10 provides pneumatic control of movement of the apparatus through the water column in a stable manner. The present aquaculture apparatus 10 also provides for automated air desiccation of shellfish 28 produced in off-bottom containerized aquaculture systems for the purposes of controlling bio-fouling on the surfaces of the shellfish and aquaculture equipment.

Figure 1:
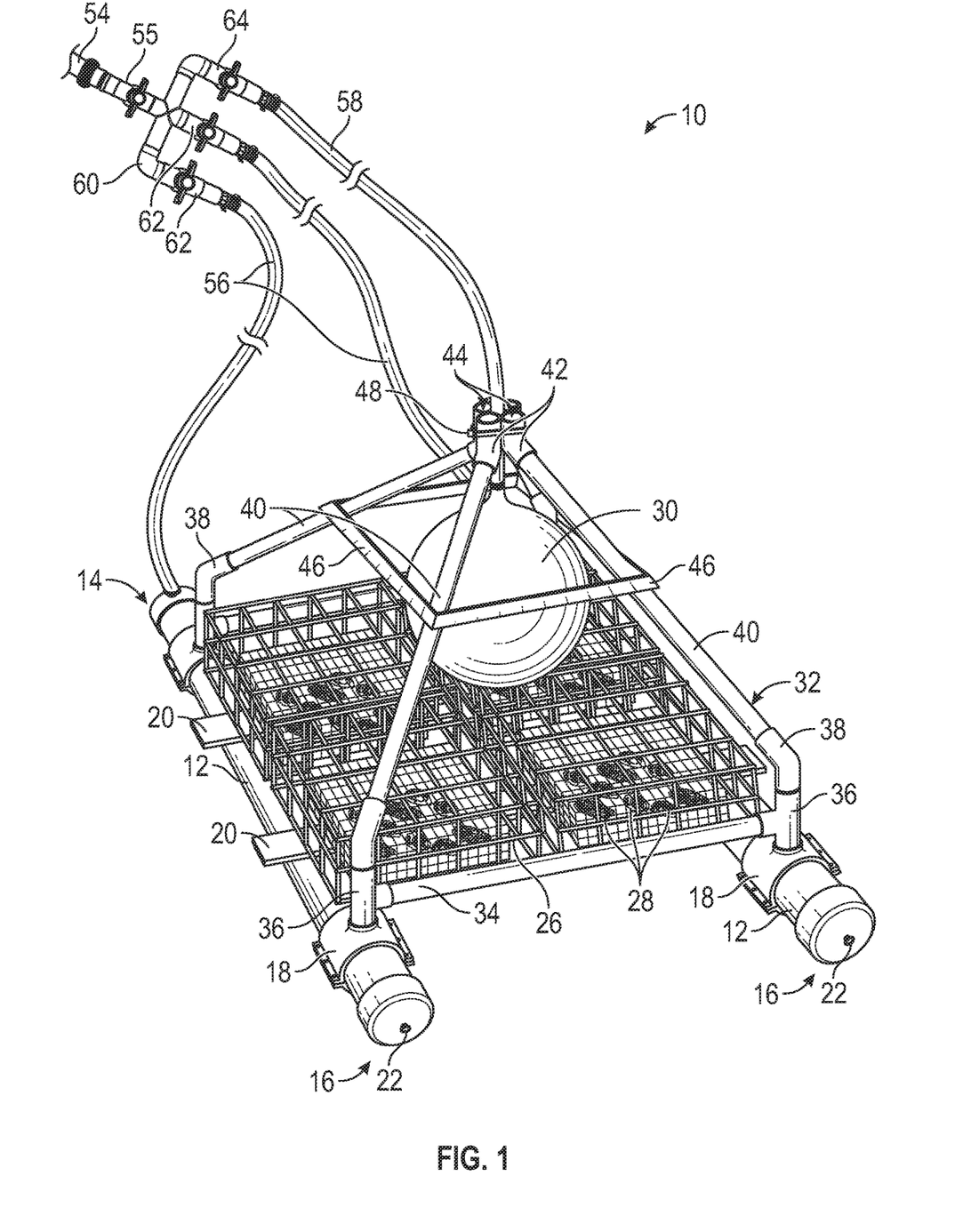
FIG. 1 is a top perspective view of an aquaculture apparatus in accordance with the present disclosure.
Figure 2:
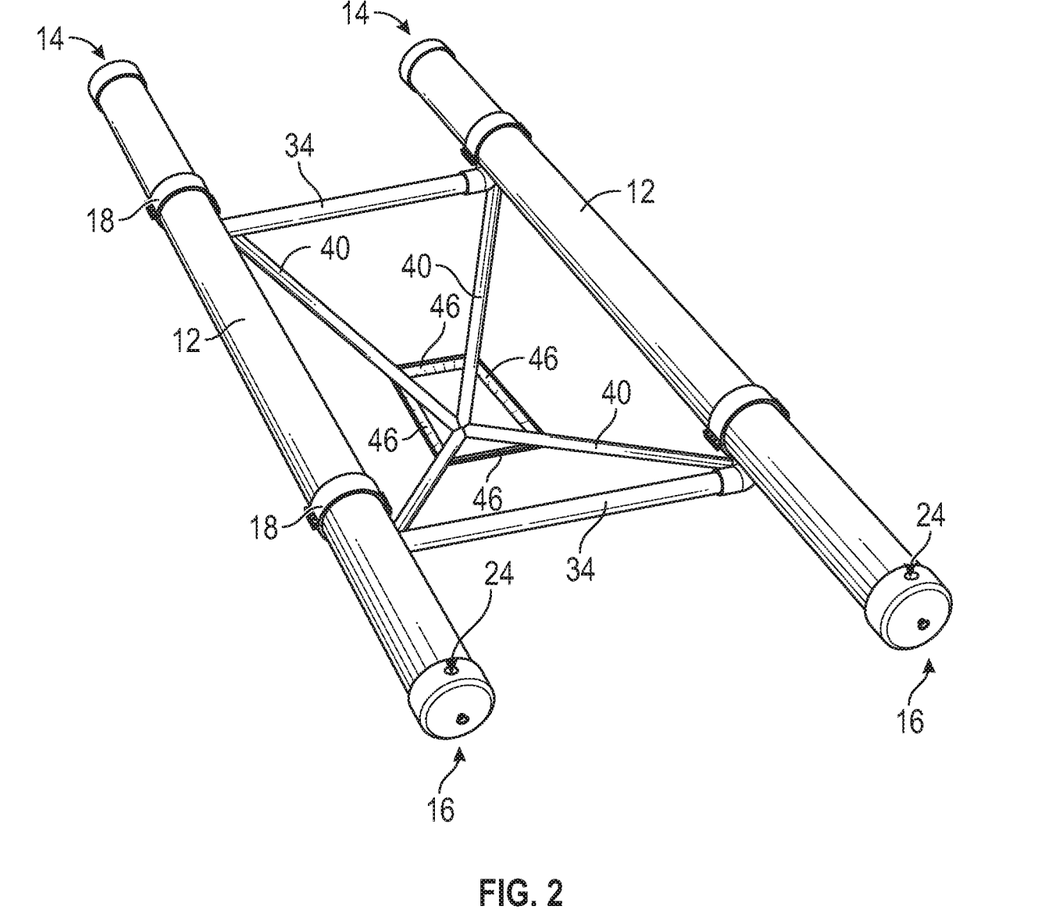
FIG. 2 is a bottom perspective view of an aquaculture apparatus in accordance with the present disclosure.

The aquaculture apparatus 10 comprises a lift vessel 12, a container 26 for holding shellfish 28, an inflatable buoy bladder 30, and a compressed gas source 50 configured to independently supply gas to each of the lift vessel 12 and the buoy bladder 30. The buoy bladder 30 is disposed above both the container 26 and the lift vessel 12 when the apparatus 10 is in an upright position for normal use. FIG. 1 and FIGS. 3-5 each show the apparatus 10 in an upright position, while FIG. 2 shows the apparatus inverted to illustrate a bottom side of the apparatus (some components have been omitted from FIG. 2 to better illustrate certain components of the apparatus). As best seen in FIG. 1, the buoy bladder 30 is retained in a centered position of the apparatus, preferably by a frame 32 secured to the apparatus. As used herein, a "centered position" indicates that the buoy bladder 30 is retained in a position that is generally centered between a front end 14 and a rear end 16 of the apparatus, as well as being retained in a generally centered position between two sides of the apparatus between the front and rear ends. The buoy bladder 30 is made of a flexible material so that it can be inflated and deflated. Due to the flexible nature of the material, the buoy bladder 30 may shift off-center within certain tolerances during normal operation of the apparatus, though the bladder is generally retained in the centered position in order to maintain stability when the apparatus is being moved between different positions, as well as when the apparatus is moving through all segments of the water column.

A lift vessel fluid supply line 56 connects the lift vessel 12 to the compressed gas source 50, and a buoy bladder fluid supply line 58 connects the buoy bladder 30 to the compressed gas source 50. In a preferred embodiment, these gas lines are connected to a manifold 60 having valves 62, 64 for independent control of gas flows. The compressed gas is preferably air, and the compressed gas source 50 is preferably a pressurized tank, such as a SCUBA tank, or an air compressor. In alternative embodiments, other suitable gases may be utilized, such as nitrogen or helium.

Figure 3:
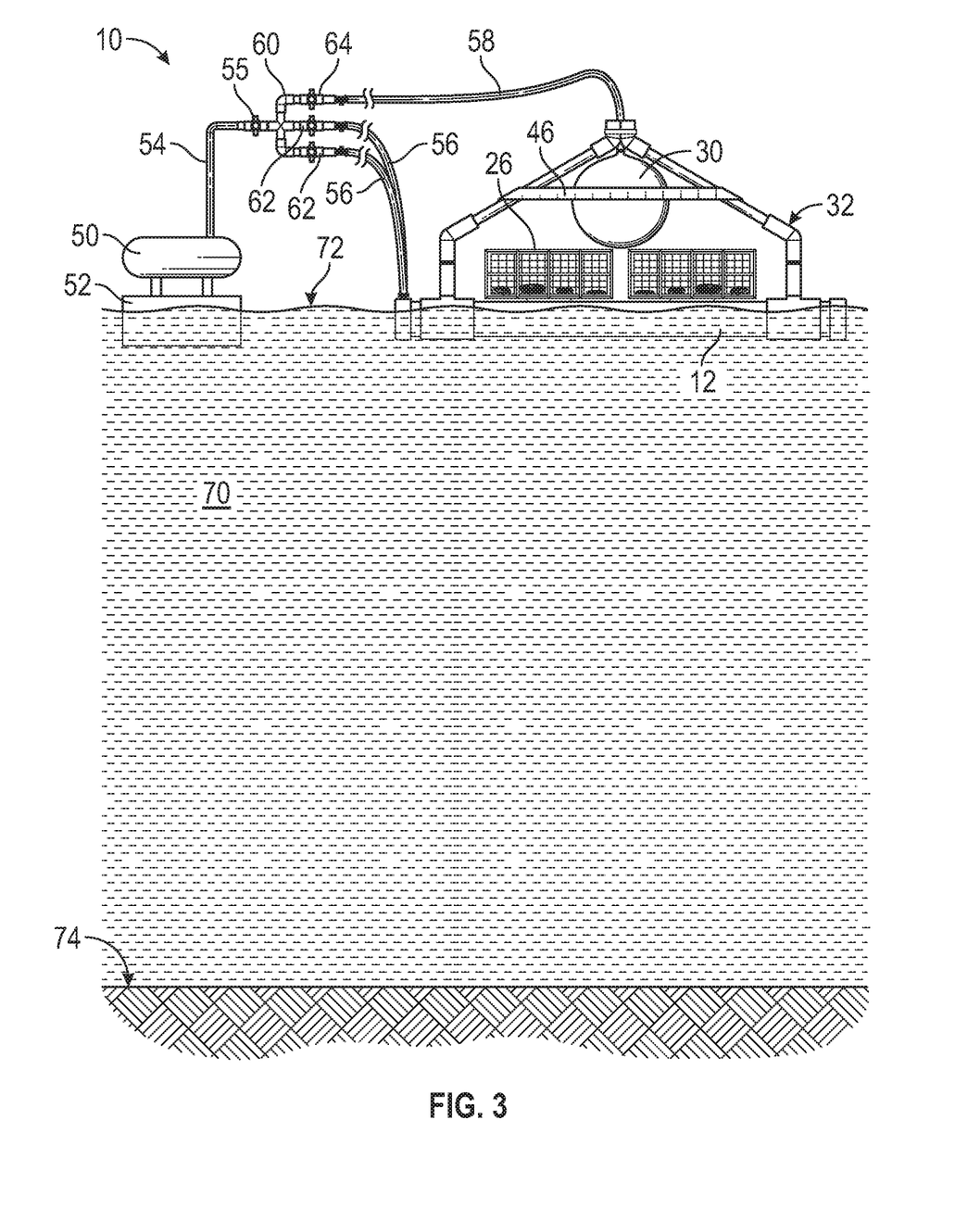
FIG. 3 is a side view of an aquaculture apparatus in a floating position while in use in a body of water in accordance with the present disclosure.
Figure 4:
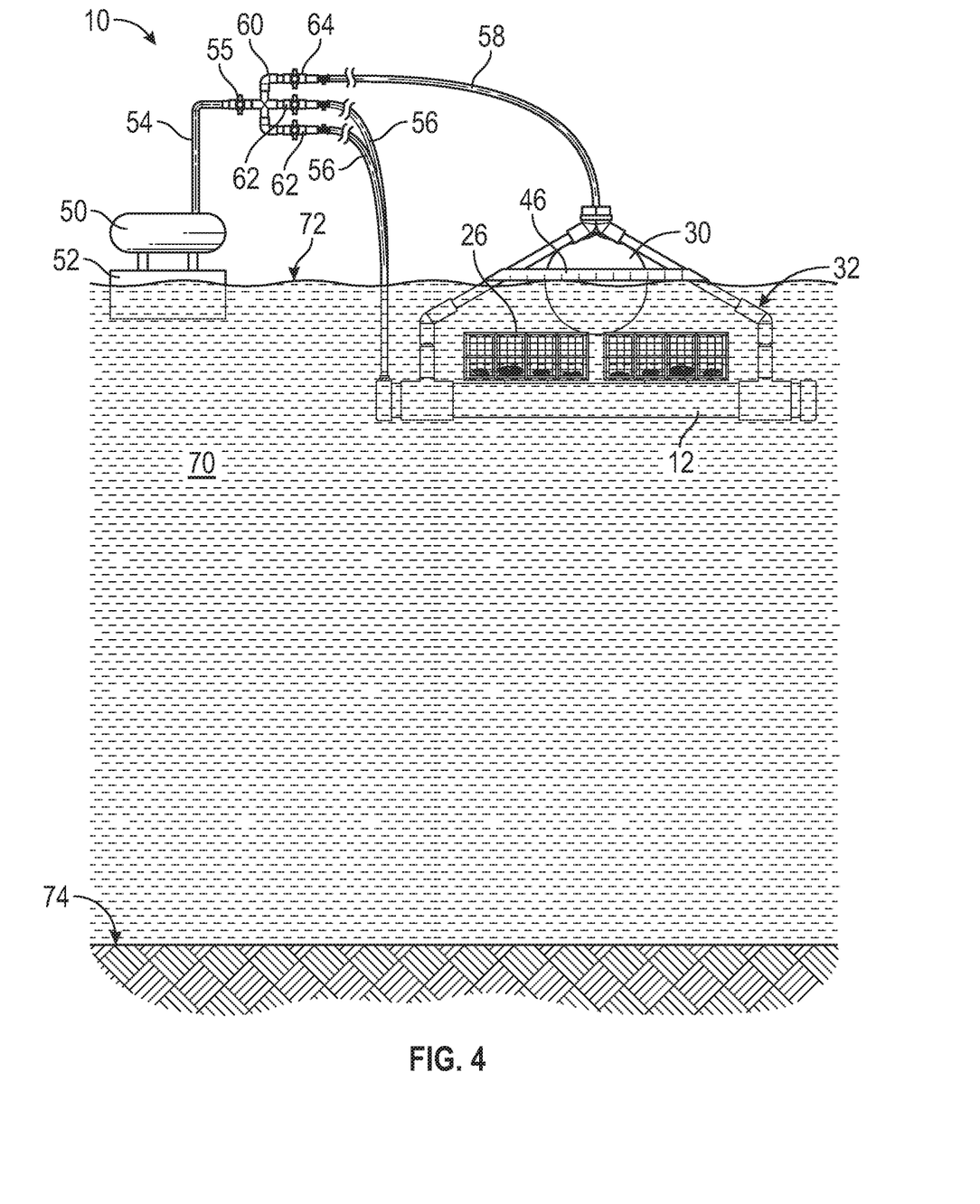
FIG. 4 is a side view of an aquaculture apparatus in a suspended position while in use in a body of water in accordance with the present disclosure.
Figure 5:
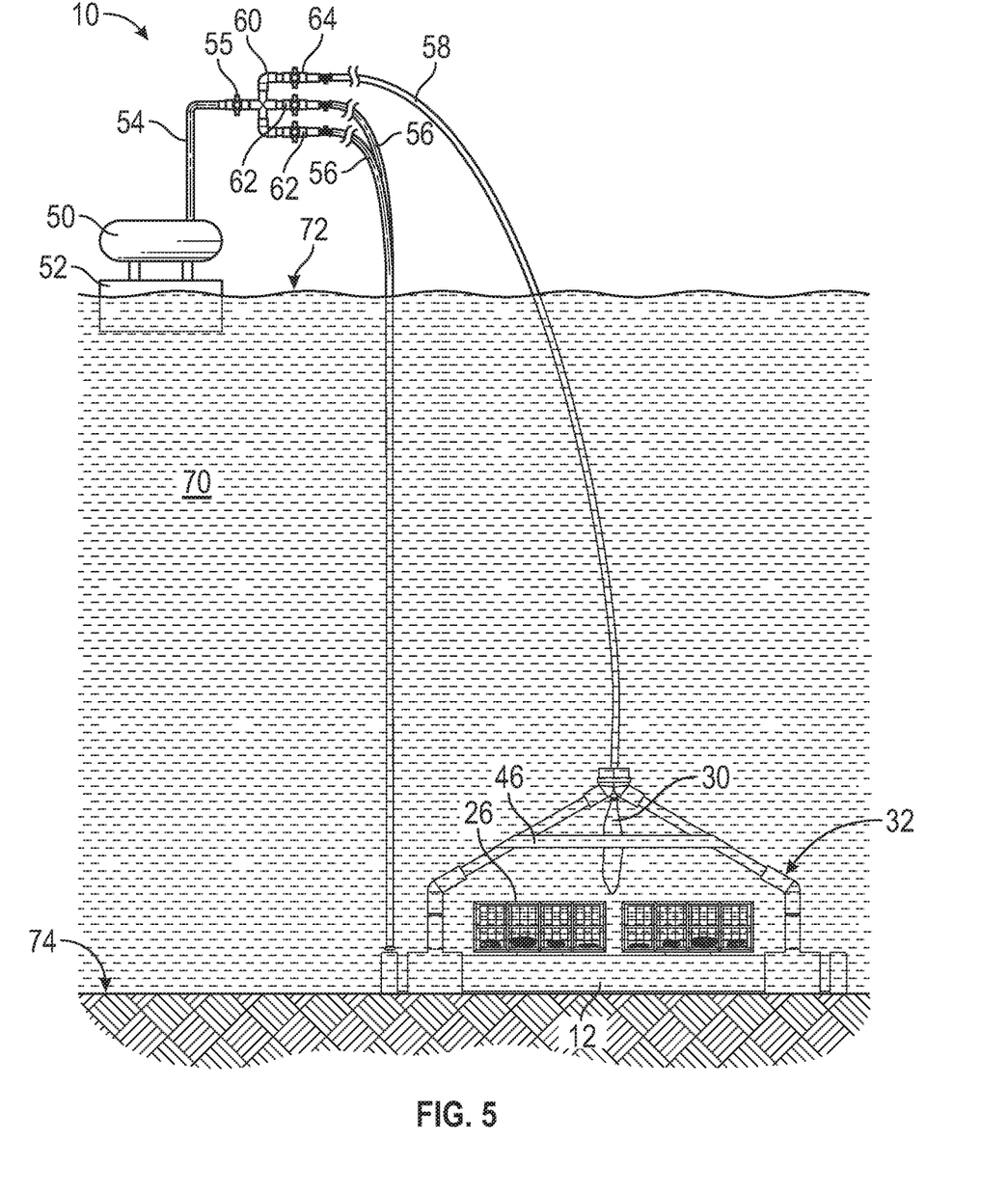
FIG. 5 is a side view of an aquaculture apparatus in a submerged position while in use in a body of water in accordance with the present disclosure.
Figure 8:
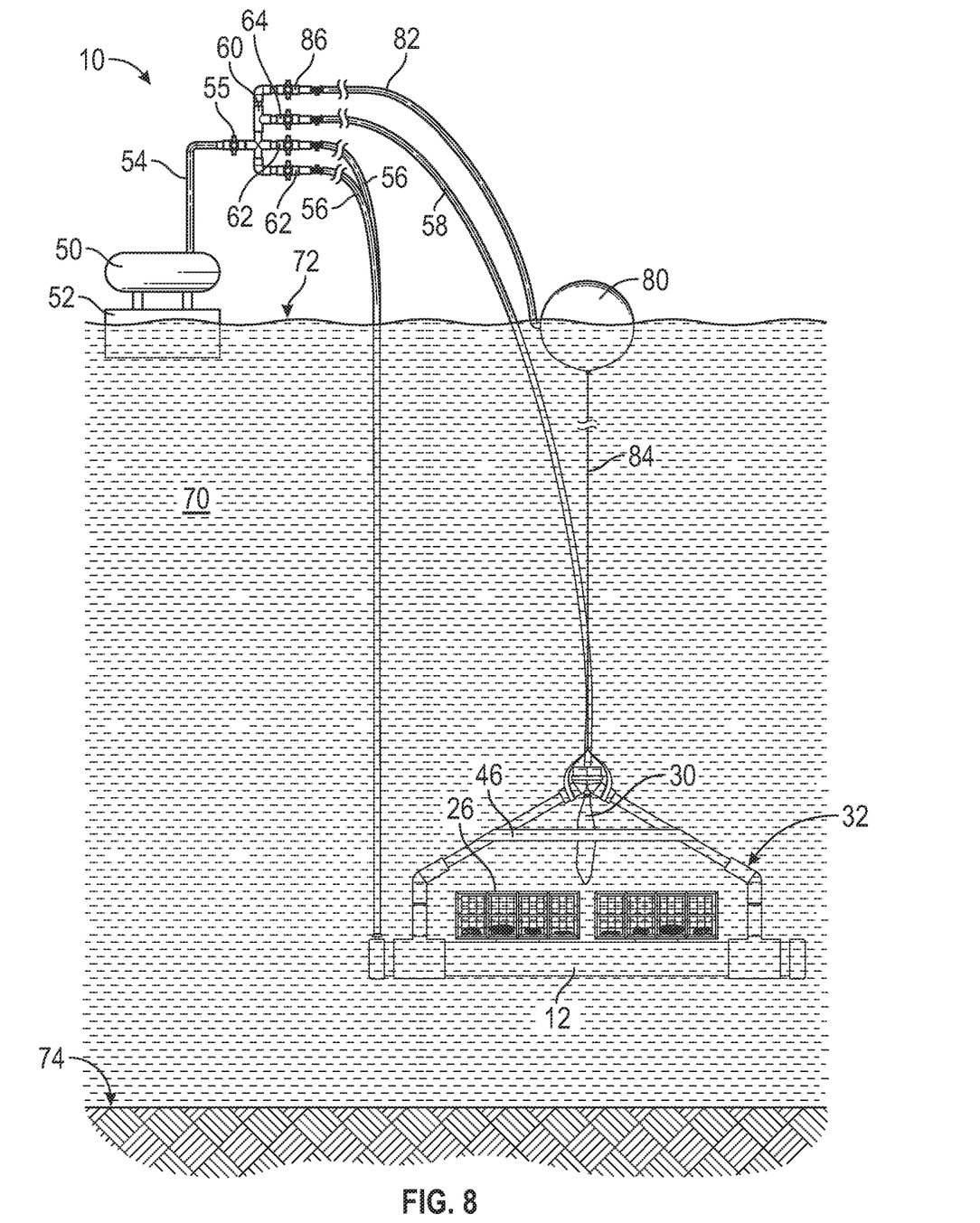
FIG. 8 is a side view of an alternative embodiment of an aquaculture apparatus in a submerged, off-bottom position while in use in a body of water in accordance with the present disclosure.

As shown in FIGS. 3-5, respectively, the aquaculture apparatus 10 is adapted for use in three positions: a floating position, a suspended position, and a submerged position. When in the floating position, as shown in FIG. 3, the lift vessel 12 is filled with gas and the container 26 holding shellfish 28 is positioned above the surface 72 of the water 70. Thus, in the floating position, the shellfish 28 may be held out of the water 70 for a period of time sufficient to allow air desiccation in order to prevent the formation of biofilm on the containers 26 and shellfish 28, and various aquaculture activities may additionally be performed while the apparatus 10 is floating. When in the suspended position, as shown in FIG. 4, the buoy bladder 30 is inflated with gas with both the container 26 holding shellfish 28 and the lift vessel 12 suspended under the water surface below the buoy bladder 30. The suspended position provides a transition between the floating and submerged positions that allows stability when moving the apparatus between the floating and submerged positions. In addition, some aquaculture activities may be performed in the suspended position, if desired. For instance, in some cases, it may be desired to allow shellfish 28 to grow near the water surface, depending on certain environmental conditions. In such cases, the apparatus may be left in the suspended position for a period of time for shellfish growth. When in the submerged position, as shown in FIG. 5, the buoy bladder 30 is deflated and gas is evacuated from the lift vessel 12 so that the apparatus 10 is resting on the water bottom 74. The apparatus may be left in the submerged position for a desired period of time to allow for shellfish growth before harvesting or to avoid storm damage from high wave energy. In an alternative embodiment, as shown in FIG. 8, the apparatus 10 may be held at a desired depth in the water column by a second buoy 80 tethered to the apparatus even when the buoy bladder 30 is deflated and gas is evacuated from the lift vessel 12.

The lift vessel 12 preferably comprises a lift tank 12 having rigid walls and an opening 24 on a bottom side of the lift tank 12, which can be seen in FIG. 2. The opening 24 allows water to enter the interior of the lift tank 12 to displace air in the lift tank 12 when moving the apparatus from the floating position to the suspended position. The opening 24 also provides a passageway through which air may displace water in the lift tank 12 by forcing the water out through the opening 24 when moving the apparatus from the suspended position to the floating position. In a preferred embodiment, as best seen in FIGS. 1 and 2, the apparatus 10 comprises a plurality of lift tanks 12 that each have an elongated tubular shape and that are spaced apart. In this embodiment, the apparatus 10 further comprises a plurality of lift vessel fluid supply lines 56 each connecting a respective one of the plurality of lift tanks 12 to the compressed gas source 50. Each lift tank 12 has a first end 14 and a second end 16. As shown in FIG. 1, each lift vessel fluid supply line 56 is connected to a respective first end 14 of a lift tank 12, and each lift tank 12 has an opening 24 located on the bottom side of the lift tank 12 and positioned at the second end 16 of the lift tank 12, as shown in FIG. 2. FIG. 1 illustrates the apparatus with two lift tanks 12, though additional spaced lift tanks may be utilized to increase the capacity of the apparatus.

As shown in FIG. 1, the tubular lift tanks 12 may preferably be constructed of a length of pipe, such as PVC (polyvinyl chloride) pipe, with end caps. In a preferred embodiment, the lift tanks 12 may be constructed of 12-inch diameter pipes sealed with end caps to provide a sealed enclosure for floatation. Although lift tanks of other sizes or configurations may be utilized, cylindrical tubular tanks spaced apart may be preferred because such a lift tank configuration may function in a similar manner as a catamaran, thereby allowing the apparatus to be towed more easily by a motorized vessel by reducing drag as the apparatus 10 moves on the water surface when in the floating position. To facilitate towing, one or both ends of each tubular lift tank 12 may have a loop 22 installed thereon for securing a tow rope, chain, or similar type of tow line. Enhanced mobility of the apparatus makes it possible to more easily escape adverse environmental conditions such as oil spills, sewerage discharges, algae blooms and storm water pollution. An additional advantage of mobility is the ability to relocate mature oysters from a brackish water area where they are grown to a water body with a higher salt content. The oysters can be relocated and submerged there for several days to obtain a salty taste prior to going to market, which may increase the market value of the shellfish.

The apparatus 10 may further comprise a frame 32 that is adapted to retain the inflatable buoy bladder 30 in a centered position of the apparatus. The frame 32 also provides a rigid connection between the spaced lift tanks 12. As shown in FIG. 1, the frame 32, as well as the lift tanks 12, may preferably be constructed of PVC pipe and pipe fittings, which may provide inexpensive and lightweight construction materials that may be sized to construct aquaculture apparatuses of varying dimensions. However, it should be appreciated by one skilled in the art that other suitable materials may be utilized in constructing the frame 32, such as metal or other types of polymers, which may optionally be formed from a solid structure rather than having a hollow interior. In a preferred embodiment, as best seen in FIG. 1, the frame 32 comprises four frame members 40 that generally meet at a centered position of the apparatus 10 above the containers 26 and lift tanks 12. The frame 32 preferably includes cross-support members 34 to provide structural support between the spaced lift tanks 12. In a preferred embodiment, the frame 32 may be secured to each of the lift tanks 12 with a plurality of tapping saddles 18 (although the tapping saddles 18 are used only to secure the frame 32 to the lift tanks 12 and do not tap into the piping used to form the lift tanks). The tapping saddles 18 are preferably positioned toward each end 14, 16 of each of the tubular lift tanks 12. Each tapping saddle 18 may comprise two halves, which may be bolted together around the pipe forming each lift tank 12, and may have a tee 36 attached to a top half of the saddle 18. The tee 36 may be used to connect the cross-support members 34 thereto in order to form structural supports between lift tanks 12 and to connect the frame members 40 to the lift tanks 12. Elbow joints 38, which are preferably 45-degree elbows, are preferably used to connect the frame members 40 to the tees 36 so that the four frame members 40 may generally meet at a centered position of the apparatus 10 to retain the buoy bladder 30 in the center of the apparatus. In a preferred embodiment, as shown in FIG. 1, additional elbow joints 42 may be connected to the opposite end of each frame member 40 so that the elbow joints 42 physically contact each other and provide a space between the elbow joints 42 through which the buoy bladder fluid supply line 58 may run to supply gas to the buoy bladder 30 positioned inside the frame 32. The elbow joints 42 may be bound together by a band 48 tightened around the elbow joints 42 or any similar type of fastening mechanism suitable for holding the elbow joints 42 together to maintain structural integrity of the frame 32.

In a preferred embodiment, each of the elbow joints 42 may have an open end 44 facing upward. The open ends 44 may allow water to displace air inside the frame members 40 when moving the apparatus to the submerged position so that the apparatus sinks to the water bottom 74 easily. An opening (not shown) may be formed in each tee 36 or at another low point of the frame 32 so that water inside the frame members 40, as well as the cross-support members 34, can drain out of the frame 32 when moving the apparatus to the floating position in order to minimize the weight of the apparatus when it is out of the water.

In a preferred embodiment, as best seen in FIG. 1, the frame 32 further comprises a plurality of retaining members 46 secured to the frame members 40 in a position suitable to prevent the buoy bladder 30 from inadvertently sliding between any of the frame members 40 during normal operation of the apparatus 10. For instance, when moving the apparatus from the suspended position to the floating position, the first end 14 of each lift tank 12 may rise to the water surface 72 before the second end 16, which may cause the buoy bladder 30 to shift toward a position between the two frame members 40 closest to the first end 14 of each lift tank 12. In this case, the retaining members 46 may prevent the buoy bladder 30 from sliding between those frame members 40, thereby retaining the buoy bladder 30 in a generally centered position, which may be defined by a perimeter formed by the retaining members 46. When lowering the apparatus from the floating position to the suspended position, the opposite retaining member 46 may prevent the buoy bladder 30 from sliding between frame members 40 in a similar manner. In alternative embodiments, other types of retaining structures, such as a netting or a cage structure, may be utilized to retain the buoy bladder 30 in a centered position between frame members 40, though it is preferred that a solid structure not be used in order to minimize drag as the apparatus moves up and down in the water column.

Although FIG. 1 illustrates one preferred embodiment of a frame 32 suitable for retaining the buoy bladder 30 in a generally centered position above the containers 26 and lift tanks 12, it should be understood that any frame structure suitable for retaining the buoy bladder 30 in such a centered position may be utilized, which may include frames having various shapes and configurations, and still fall within the scope of the present disclosure.

The aquaculture apparatus 10 comprises at least one container 26 for holding shellfish 28. As best seen in FIG. 1, the container is preferably a cage, and the apparatus preferably comprises a plurality of cages 26 for holding the shellfish 28, though any type of container or carrier suitable for use in shellfish aquaculture may be utilized. The container 26 should be designed to provide sufficient water flow around the shellfish 28 to allow for adequate shellfish growth. One or more planks 20, beams, or similar support structure may be utilized to help support the weight of the cages 26 and shellfish 28. The planks 20 may preferably be secured to each of the lift tanks 12. The containers 26 may be secured to the planks 20, lift tanks 12, and/or frame 32 by any suitable securing or fastening means known in the art. For instance, shellfish cages 26 may be bolted to the planks 20 and may optionally also be tied down to or strapped to the lift tanks 12 and/or cross-support members 34 in order to ensure that the cages 26 remain secured to the apparatus 10 at all times during normal operation, which may include the apparatus 10 being tilted when moving it between the floating, suspended, and submerged positions.

In a preferred embodiment, the apparatus 10 further comprises a manifold 60 configured to independently supply gas from the compressed gas source 50 to each of the lift vessel 12 and the buoy bladder 30. As best seen in FIG. 1, the manifold 60 comprises a plurality of valves for controlling the gas flow. The manifold 60 is fluidly connected to the compressed gas source 50 through a primary fluid supply line 54 and has a primary gas supply valve 55 for controlling the flow of gas from the compressed gas source 50 into the manifold 60. The manifold 60 is fluidly connected to the buoy bladder 30 through a buoy bladder fluid supply line 58, which preferably extends through an opening between the frame members 40 and is connected to a top side of the buoy bladder 30. The manifold has a float valve 64 for supplying gas to the buoy bladder 30 in order to float the apparatus 10 from the submerged position to the suspended position in which the buoy bladder 30 is floating at the water surface 72. The manifold 60 further comprises at least one lift valve 62 for supplying gas to one or more lift vessels 12 through at least one lift vessel fluid supply line 56.

In a preferred embodiment in which the apparatus 10 comprises a plurality of tubular lift tanks 12, the apparatus 10 further comprises a plurality of lift tank fluid supply lines 56 individually connecting each respective lift tank 12 to the manifold 60. The manifold 60 preferably comprises a plurality of lift valves 62 arranged to individually control the flow of gas to each respective lift tank 12. Alternatively, a single lift valve 62 may control the flow of gas to multiple lift tanks 12, though independent control to each lift tank 12 is preferred to maintain stability by ensuring that all lift tanks rise simultaneously when floating the apparatus. In a preferred embodiment, each lift tank fluid supply line 56 is connected to the first end 14 of each respective lift tank 12, and the opening 24 on the bottom side of each lift tank 12 is positioned at the second end 16. In addition, each lift tank fluid supply line 56 is preferably connected to a top side of the lift tank 12. This configuration allows tubular lift tanks 12 to move between the floating and suspended positions while maintaining stability of the apparatus.

A method of controlling floatation of an aquaculture apparatus 10 is also provided. FIG. 3 shows the apparatus 10 in the floating position, FIG. 4 shows the apparatus 10 in the suspended position, and FIG. 5 shows the apparatus 10 in the submerged position. In the floating position, the lift vessel 12, which may comprise a plurality of lift tanks 12, is filled with gas, which is preferably air, so as to lift the containers 26 and shellfish 28 out of the water 70. In the floating position, the buoy bladder 30 may be in an inflated or a deflated state. FIG. 3 shows the buoy bladder 30 in an inflated state, but it may preferably be deflated to minimize its size if work is to be done on the apparatus, such as harvesting shellfish. In the suspended position, the buoy bladder 30 is inflated so that the buoy bladder 30 floats on the water surface 72 with the container 26 suspended in the water below the buoy bladder 30. In the suspended position, gas is evacuated from the lift vessel 12 so that the lift vessel 12 sinks below the water surface. In the preferred embodiment utilizing rigid lift tanks 12, the air evacuated from inside the lift tanks 12 is displaced with water 70 as the air is evacuated to sink the lift tanks 12. In the submerged position, the buoy bladder 30 is deflated, and air is evacuated from the lift tanks 12 so that the apparatus 10 sinks to the bottom 74 of the body of water 70.

The apparatus 10 may be moved sequentially in steps from the floating position to the suspended position to the submerged position, and then, by reversing the steps, from the submerged position to the suspended position to the floating position. To move the apparatus from the submerged position to the suspended position, air or another suitable gas is supplied to the buoy bladder 30 to inflate the buoy bladder 30, thereby causing the apparatus 10 to rise in the water column until the buoy bladder 30 is floating on the water surface 72 with both the container 26 and the lift tanks 12 suspended in the water 70 below the buoy bladder 30, as shown in FIG. 4. Air may be supplied to the buoy bladder 30 by opening the primary gas supply valve 55 to supply air from the compressed gas source 50 to the manifold 60. The float valve 64 may then be opened to supply air from the compressed air source 50 to the buoy bladder 30 through the manifold 60. The rate of air flow to the buoy bladder 30 may preferably be controlled so that the apparatus 10 rises through the water column at a slow, steady rate to maintain stability. The rate of air flow may be controlled manually using the float valve 64 and/or the primary gas supply valve 55, or optionally, the apparatus 10 may include automated control equipment to control the air flow rate.

Once in the suspended position, the apparatus may then be moved to the floating position, as shown in FIG. 3. To move the apparatus from the suspended position to the floating position, air is supplied to the lift tanks 12, which causes the lift tanks 12 to rise from the suspended position to the floating position in which the container 26 holding shellfish 28 is lifted and held above the water surface 72. Air may be supplied to the lift tanks 12 by opening the primary gas supply valve 55 and each of the lift valves 62 to supply air to each lift tank 12. The lift valves 62 are preferably opened simultaneously so that each lift tank 12 rises simultaneously to maintain stability of the apparatus. As air flows into each lift tank 12 at the first end 14 of the lift tank 12, the water 70 inside the lift tank 12 is forced out of the opening 24 on the bottom side of the lift tank 12 at the second end 16 of the lift tank 12 until air displaces substantially all of the water in each lift tank 12. Having the lift vessel fluid supply line 56 connection and the opening 24 at opposite ends of each lift tank 12 ensures that substantially all of the water in each lift tank 12 is displaced. Once the water is displaced with air and the lift tanks 12 are floating on the water surface 72, the lift valves 62 may be closed to shut off the flow of air. With the openings 24 positioned on the bottom side of each lift tank 12 and the weight of the apparatus 10 keeping the openings 24 just below the water surface 72, air pressure inside the lift tanks 12 will be maintained so that the lift tanks 12 remain afloat without requiring a constant flow of air to the lift tanks 12.

Because air flows into each lift tank 12 at one end 14, the first end 14 tends to rise to the water surface 72 before the second end 16, thereby tilting the apparatus 10 during the process of moving the apparatus between the suspended and floating positions. However, by retaining the inflated buoy bladder 30 in a centered position of the apparatus, the inflated buoy bladder 30 remains floating on the water surface 72 until the lift tanks 12 completely lift it out of the water, which provides leverage that prevents the first end 14 from floating above the second end 16 to an extent that would cause the apparatus to become unstable and inadvertently overturn. Thus, the frame 32 retaining the inflated buoy bladder 30 in a centered position maintains stability during the process of moving the apparatus 10 between the suspended and floating positions.

To reverse this process and move the apparatus 10 from the floating position back to the suspended position, air is evacuated from the lift tanks 12 by relieving pressure in each lift tank 12 to the atmosphere so that water 70 then displaces the air in each lift tank 12 via water 70 entering each lift tank 12 through the openings 24 on the bottom side of each lift tank 12, thereby causing both the lift tanks 12 and the container 26 to sink to the suspended position while the buoy bladder 30 is inflated and floating on the water surface 72. If the buoy bladder 30 is deflated, it should be inflated by supplying air to the buoy bladder 30 via the float valve 64 prior to relieving pressure on the lift tanks 12. Pressure on the lift tanks 12 may be relieved via the lift tank fluid supply lines 56 by disconnecting the primary fluid supply line 54 from the primary gas supply valve 55 and opening the lift valves 62 and the primary gas supply valve 55. At this point, the float valve 64 should remain closed to maintain air pressure inside the inflated buoy bladder 30. In an alternative embodiment, the manifold 60 may have one or more separate designated pressure relief valves that may be opened individually for the purposes of relieving pressure on one or more lift tanks 12, as well as the buoy bladder 30, to the atmosphere without the need to disconnect the primary fluid supply line 54 from the manifold 60. Once pressure is removed from each lift tank 12, the weight of the apparatus 10 will cause water 70 to displace substantially all of the air inside each lift tank 12. As the air is displace by water 70, the lift tanks 12 will sink to the suspended position below the buoy bladder 30, which will then be floating on the water surface 72, as shown in FIG. 4.

Once the apparatus 10 is in the suspended position, it may then be moved to the submerged position, as shown in FIG. 5. To move the apparatus from the suspended position to the submerged position, pressure on the buoy bladder 30 is relieved so that the buoy bladder 30 deflates, thereby causing the entire apparatus 10 to sink to the bottom 74 of the body of water 70. Pressure on the buoy bladder 30 may be relieved to the atmosphere via the buoy bladder fluid supply line 58 by opening the float valve 64 and the primary gas supply valve 55 with the primary fluid supply line 54 being disconnected. The rate of deflation of the buoy bladder 30 may be controlled so that the apparatus 10 sinks slowly in a controlled manner to maintain stability.

As shown in FIGS. 3-5, the compressed gas source 50 is preferably secured to a floating barge 52 or similar floating structure floating on the water surface 72. The barge 52 may be moved to service multiple aquaculture apparatuses 10 in an area by connecting and disconnecting the compressed air source 50 to and from separate manifolds 60 for each apparatus 10 to be moved between the floating, suspended, or submerged positions. Alternatively, a separate gas source manifold may be used to connect a plurality of primary fluid supply lines 54 to a plurality of manifolds 60 for each aquaculture apparatus 10 so that the compressed gas source 50 may service multiple apparatuses 10 without the need to move the compressed gas source 50. In this case, the compressed gas source 50 may optionally be secured to a dock or other stationary structure. The compressed gas source 50 is preferably a pressurized air tank or an air compressor.

The length of the buoy bladder fluid supply line 58 and the lift vessel fluid supply lines 56 may be varied depending on the depth of water 70 in which the aquaculture apparatus 10 is being deployed. A spooling device may optionally be utilized to manage lengths of air supply lines so that the lines may be spooled when moving the apparatus to the floating position and unspooled when moving the apparatus to the submerged position. The manifold 60 is preferably kept above the water surface and may be secured to a separate floating structure, which may additionally function as a marking buoy to mark the location of a submerged apparatus. By utilizing a lift vessel 12 in combination with a buoy bladder 30 retained in a centered position of the apparatus, the present aquaculture apparatus may be utilized in relatively deep bodies of water 70 while providing stable movement between three different modes of operation and through the entire water column. The floating position is generally used for air desiccation of shellfish 28, as well as various aquaculture activities, such as harvesting shellfish, and the submerged position is generally used for growing shellfish. The suspended position may be utilized simply as a stable transition stage between the floating and submerged positions, or may additionally be used for shellfish growth near the water surface. The apparatus 10 may optionally be attached to an anchor with an anchor line to limit movement of the apparatus on the water surface when in the floating or suspended positions.

Figure 6:
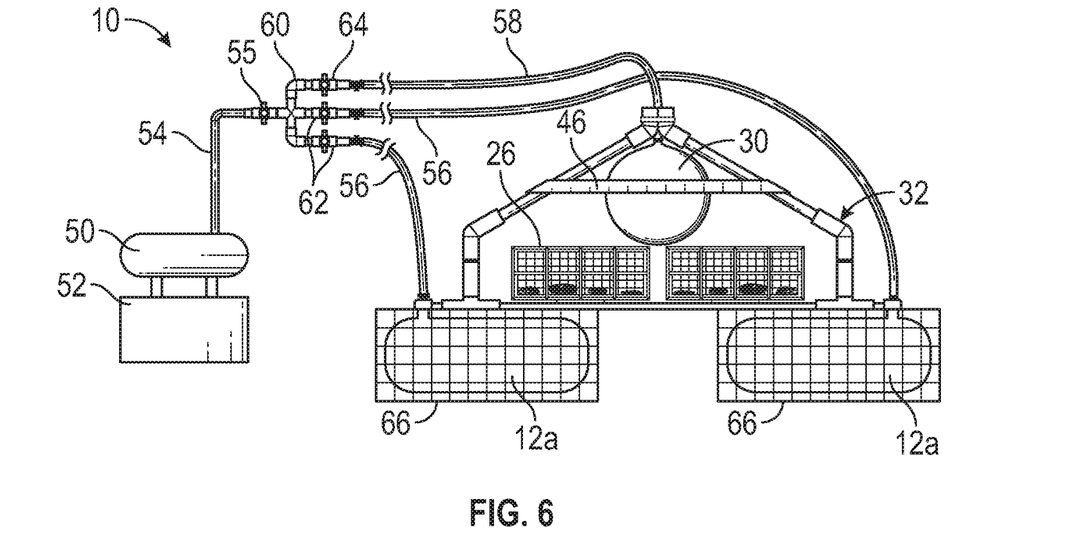
FIG. 6 is a side view of an alternative embodiment of an aquaculture apparatus in accordance with the present disclosure.
Figure 7:
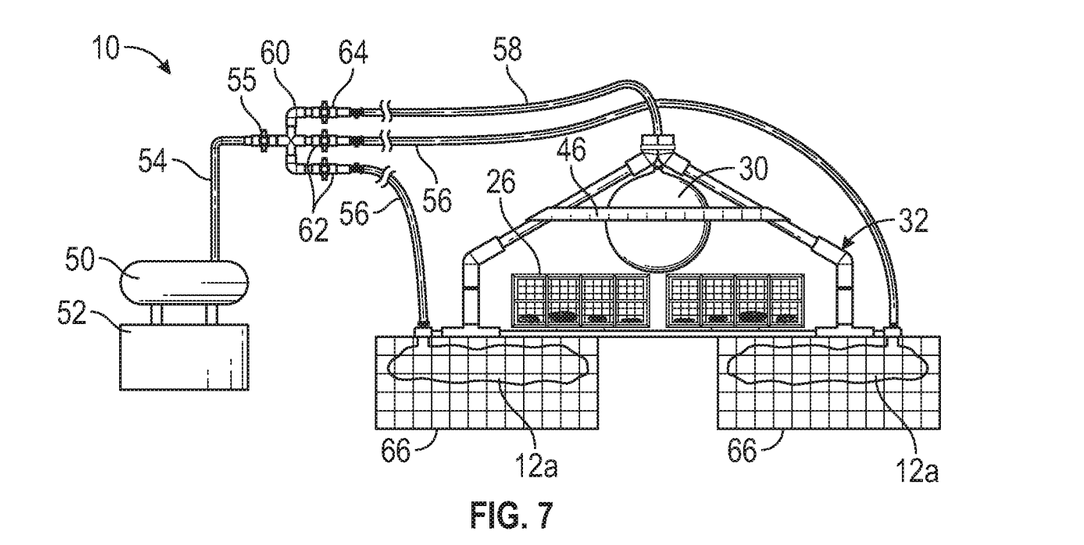
FIG. 7 is a side view of an alternative embodiment of an aquaculture apparatus in accordance with the present disclosure.

In an alternative embodiment, the lift vessel 12 may comprise an inflatable lift bladder 12a, as shown in FIGS. 6 and 7, and preferably two lift bladders 12a positioned at opposing ends of the apparatus and spanning the width of the apparatus. Each lift bladder 12a is preferably disposed within a rigid cage 66 to protect the lift bladder 12a to retain it in a fixed location. In this embodiment, air may simply be evacuated from each lift bladder 12a, thereby causing each lift bladder 12a to collapse into a flattened state. FIG. 6 shows each lift bladder 12a inflated so the bladders push against an interior of each cage 66, and FIG. 7 shows each lift bladder 12a partially deflated, though the bladders may be further deflated when the apparatus is in the suspended or submerged position. Thus, to move the apparatus from the floating position in which each lift bladder 12a is inflated to the suspended position, air may be evacuated from each lift bladder 12a by relieving pressure on each lift bladder 12a so that each lift bladder 12a deflates and collapses. When inflating the lift bladders 12a to float the apparatus to the floating position, air may be supplied to both lift bladders 12a simultaneously or may be supplied sequentially to cause one end of the apparatus to rise before the opposing end.

FIG. 8 illustrates an alternative embodiment in which the apparatus 10 further comprises a second buoy 80 tethered to the apparatus by a flexible tether line 84, the length of which may be varied to control the depth of the apparatus in the water column. The tether line 84 is preferably secured to the frame 32 at a generally centered position of the apparatus. In this embodiment, the apparatus 10 is in the submerged position with the buoy bladder 30 deflated and air evacuated from the lift tanks 12, but the apparatus is not resting on the water bottom 74. Instead, the second buoy 80 is inflated so that it is floating on the water surface 72, thereby causing the tether line 84 to hold the lift tanks 12 in a position off the water bottom at a desired depth in the water column. The second buoy 80 may optionally be connected to the manifold 60 by a second buoy fluid supply line 82 so that the second buoy 80 can be inflated using the compressed gas source 50. Gas flow to the second buoy 80 may be controlled by a second buoy fluid supply valve 86 on the manifold 60. To move the apparatus from a mid-water column position to the water bottom 74, the second buoy 80 may simply be deflated so that the second buoy 80 loses buoyancy and sinks. Alternatively, the second buoy 80 may not be connected to the manifold, in which case, to move the apparatus from a mid-water column position to the water bottom 74, the apparatus can be raised to the floating position and the tether line 84 detached from the apparatus before then moving the apparatus back to the submerged position as shown in FIG. 5.

The alternative embodiment shown in FIG. 8 provides the apparatus 10 with the capability to maintain and operate at any vertical position throughout the water column. This capability may allow the apparatus 10 to be used in the production of a variety of other aquatic species in pens or on lines suspended below the lift tanks 12, such as cultured crustacea, finfish, or seaweeds. For instance, kelp may be supported by lines suspended below the apparatus and grown at various depths within the water column. In this case, the apparatus 10 may be utilized solely for producing non-shellfish species, or for producing more than one aquatic species simultaneously. In cases in which the apparatus 10 is utilized solely for growing non-shellfish species, the shellfish containers may optionally be removed from the apparatus. Controlling the position of the apparatus within the water column may accelerate growth of organisms such as kelp by moving kelp lines up and down within the water column diurnally for photosynthesis and respiration. This alternative configuration may also allow for quickly and easily sinking gear to the water bottom to avoid damaging storm waves. In addition, access to suspended gear at the surface would avoid the need for SCUBA divers or submersibles for aquaculture activities such as feeding, density reductions, harvest, gear maintenance and repair.

It is understood that versions of the invention may come in different forms and embodiments. Additionally, it is understood that one of skill in the art would appreciate these various forms and embodiments as falling within the scope of the invention as disclosed herein.

What is claimed is:

1. An aquaculture apparatus, comprising:
    a lift vessel,
    a container for holding shellfish,
    an inflatable buoy bladder disposed above the container and above the lift vessel when the apparatus is in an upright position, wherein the inflatable buoy bladder is retained in a centered position of the apparatus,
    a compressed gas source configured to independently supply gas to each of the lift vessel and the buoy bladder, respectively,
    a lift vessel fluid supply line connecting the lift vessel to the compressed gas source, and
    a buoy bladder fluid supply line connecting the buoy bladder to the compressed gas source,
    wherein the container is positioned above a water surface when the apparatus is in a floating position on the water surface in which the lift vessel is filled with gas, and wherein the container is positioned below the water surface when the apparatus is in a suspended position in which the buoy bladder is inflated with gas and in which gas is evacuated from the lift vessel.

2. The apparatus of claim 1, wherein the apparatus comprises a frame adapted to retain the inflatable buoy bladder in a centered position of the apparatus.

3. The apparatus of claim 1, wherein the lift vessel comprises a lift tank having rigid walls, wherein the lift tank has an opening located on a bottom side of the lift tank.

4. The apparatus of claim 3, wherein the apparatus comprises a plurality of lift tanks that each have an elongated tubular shape and that are spaced apart and a plurality of lift vessel fluid supply lines each connecting a respective one of the plurality of lift tanks to the compressed gas source, wherein each lift tank has a first end and a second end, wherein each lift vessel fluid supply line is connected to a respective first end of a lift tank, and wherein each lift tank has an opening located on a bottom side of the lift tank and positioned at the second end of the lift tank.

5. The apparatus of claim 1, wherein the lift vessel comprises an inflatable lift bladder.

6. The apparatus of claim 5, wherein the inflatable lift bladder is disposed within a rigid cage.

7. The apparatus of claim 1, further comprising a lift valve configured to control the supply of gas to the lift vessel and a float valve configured to control the supply of gas to the buoy bladder.

8. The apparatus of claim 1, further comprising a manifold fluidly connected to the compressed gas source through a primary fluid supply line, to the lift vessel through the lift vessel fluid supply line, and to the buoy bladder through the buoy bladder fluid supply line, wherein the compressed gas source is configured to independently supply gas to each of the lift vessel and the buoy bladder, respectively, through the manifold.

9. The apparatus of claim 1, further comprising a second buoy tethered to the apparatus by a length of flexible line.

10. An aquaculture apparatus, comprising:
    a plurality of elongated tubular lift tanks positioned parallel to each other and spaced apart, wherein each lift tank has an opening located on a bottom side of the lift tank, wherein each lift tank has a first end and a second end, wherein the opening of each respective lift tank is positioned at the second end of the lift tank,
    a container for holding shellfish,
    an inflatable buoy bladder disposed above the container and above the lift tanks when the apparatus is in an upright position,
    a frame adapted to retain the inflatable buoy bladder in a centered position of the apparatus,
    a compressed gas source fluidly connected to a manifold through a primary fluid supply line,
    a plurality of lift tank fluid supply lines individually connecting each respective lift tank to the manifold, wherein each lift tank fluid supply line is connected to the first end of each respective lift tank, wherein the manifold comprises a plurality of lift valves arranged to individually control the flow of gas to each respective lift tank, and
    a buoy bladder fluid supply line connecting the buoy bladder to the manifold, wherein the manifold comprises a float valve adapted to control the flow of gas to the buoy bladder, wherein the container is positioned above a water surface when the apparatus is in a floating position on the water surface in which each lift tank is filled with gas, and wherein the container is positioned below the water surface when the apparatus is in a suspended position in which the buoy bladder is inflated with gas and each lift tank is filled with water.

11. The apparatus of claim 10, further comprising a second buoy tethered to the apparatus by a length of flexible line.

12. A method of controlling floatation of an aquaculture apparatus, said method comprising the steps of:
provinding an aquaculture apparatus comprising:
a lift vessel,
a container for holding shellfish,
an inflatable buoy bladder disposed above the container and above the lift vessel when the apparatus is in an upright position, wherein the inflatable buoy bladder is retained in a centered position of the apparatus,
a compressed gas source configured to independently supply gas to each of the lift vessel and the buoy bladder, respectively,
a lift vessel fluid supply line connecting the lift vessel to the compressed gas source, and
a buoy bladder fluid supply line connecting the buoy bladder to the compressed gas source,
wherein the container is positioned above a water surface when the apparatus is in a floating position on the water surface in which the lift vessel is filled with gas, and wherein the container is positioned below the water surface when the apparatus is in a suspended position in which the buoy bladder is inflated with gas and in which gas is evacuated from the lift vessel;
submerging the apparatus in a body of water by evacuating gas from the lift vessel and deflating the buoy bladder;
then supplying gas from the compressed gas source to the buoy bladder to inflate the buoy bladder, thereby causing the buoy bladder to rise to the surface of the body of water with the lift vessel and the container suspended in the body of water below the inflated buoy bladder; and
then floating the apparatus by supplying gas from the compressed gas source to the lift vessel, thereby causing the apparatus to float with the container being held above the surface of the water.

13. The method of claim 12, wherein the step of submerging the apparatus comprises the steps of:
first relieving pressure from the lift vessel to the atmosphere via the lift vessel fluid supply line, thereby causing the lift vessel to sink to a suspended position below the buoy bladder; and then
relieving pressure from the buoy bladder to the atmosphere via the buoy bladder fluid supply line so that the buoy bladder deflates, thereby causing the apparatus to sink to a bottom of the body of water.

14. The method of claim 12, wherein the lift vessel comprises a lift tank having rigid walls, wherein the lift tank has an opening located on a bottom side of the lift tank, wherein the step of floating the apparatus comprises supplying gas from the compressed gas source to the lift tank so that the gas displaces water in the lift tank by forcing the water out of the opening located on the bottom side of the lift tank.

15. The method of claim 13, wherein the lift vessel comprises a lift tank having rigid walls, wherein the lift tank has an opening located on a bottom side of the lift tank, wherein the step of submerging the apparatus comprises relieving pressure from the lift vessel to the atmosphere via the lift vessel fluid supply line so that water displaces the gas in the lift tank via water entering the lift tank through the opening located on the bottom side of the lift tank.

16. The method of claim 12, wherein the lift vessel comprises an inflatable lift bladder, wherein the step of floating the apparatus comprises supplying gas from the compressed gas source to the lift bladder so that the lift bladder inflates, and wherein the step of submerging the apparatus comprises relieving pressure from the lift bladder so that the lift bladder deflates.

17. The method of claim 16, wherein the inflatable lift bladder is disposed within a rigid cage.

18. The method of claim 12, wherein the apparatus further comprises a manifold fluidly connected to the compressed gas source through a primary fluid supply line, to the lift vessel through the lift vessel fluid supply line, and to the buoy bladder through the buoy bladder fluid supply line, wherein the compressed gas source is configured to independently supply gas to each of the lift vessel and the buoy bladder, respectively, through the manifold,
wherein the step of supplying gas to the buoy bladder comprises opening a float valve on the manifold, and
wherein the step of supplying gas to the lift vessel comprises opening a lift valve on the manifold.

19. The method of claim 13, wherein the apparatus further comprises a manifold fluidly connected to the compressed gas source through a primary fluid supply line, to the lift vessel through the lift vessel fluid supply line, and to the buoy bladder through the buoy bladder fluid supply line, wherein the compressed gas source is configured to independently supply gas to each of the lift vessel and the buoy bladder, respectively, through the manifold,
wherein the step of relieving pressure from the lift vessel to the atmosphere comprises relieving pressure through the manifold, and
wherein the step of relieving pressure from the buoy bladder to the atmosphere comprises relieving pressure through the manifold.

20. The method of claim 12, wherein the apparatus comprises a frame adapted to retain the inflatable buoy bladder in a centered position of the apparatus.

21. The method of claim 13, wherein the apparatus further comprises a second buoy tethered to the apparatus by a length of flexible line and connected to the compressed gas source through a second buoy fluid supply line, wherein the step of submerging the apparatus in a body of water comprises inflating the second buoy so that the second buoy floats on the water surface, thereby causing the line to hold the lift vessel in a position off of a bottom of the body of water.

* * * * *